UNITED STATES PATENT OFFICE.

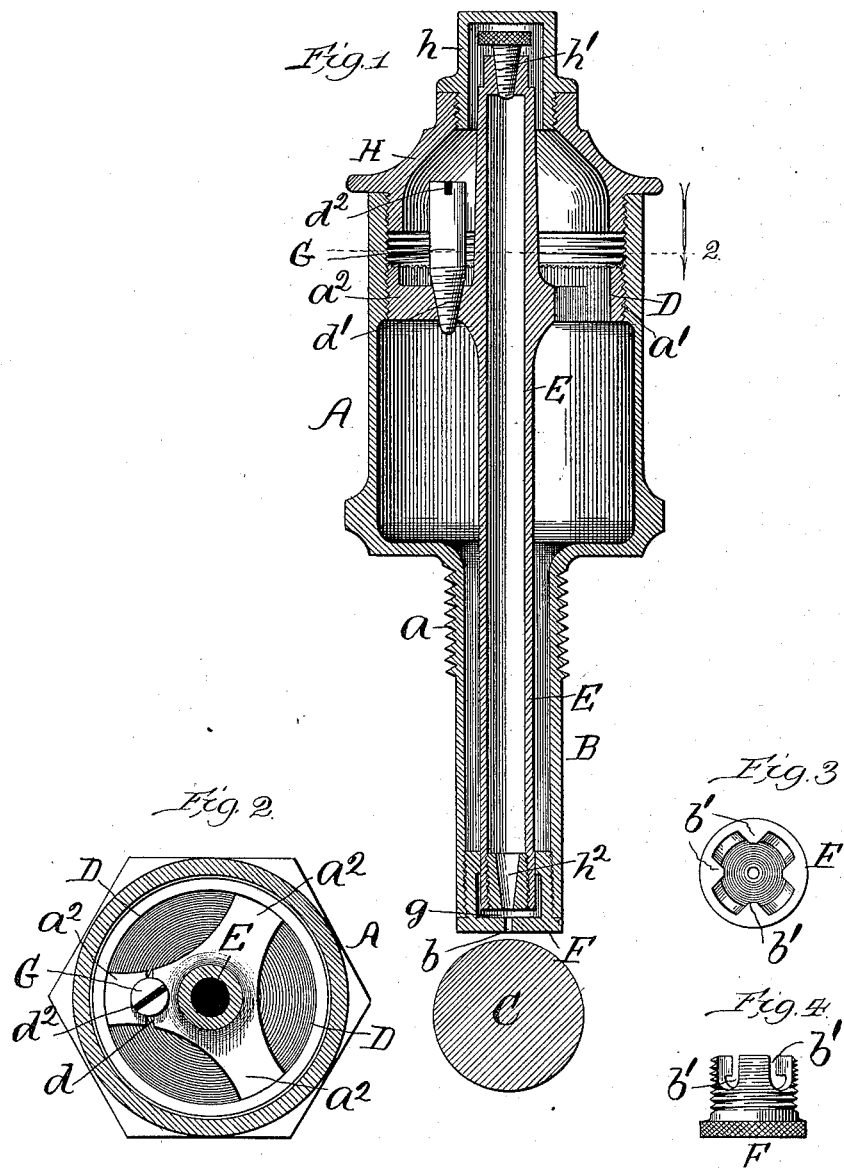

GEORGE McNEIL AND THOMAS J. ROGERS, OF CHICAGO, ILLINOIS.

LUBRICATOR.

SPECIFICATION forming part of Letters Patent No. 606,294, dated June 28, 1898.

Application filed February 25, 1897. Serial No. 625,003. (No model.)

*To all whom it may concern:*

Be it known that we, GEORGE MCNEIL and THOMAS J. ROGERS, citizens of the United States, residing at Chicago, in the county of Cook and State of Illinois, have invented certain new an duseful Improvements in Oil-Cups; and we do hereby declare the following to be a full, clear, and exact description of the invention, such as will enable others skilled in the art to which it appertains to make and use the same.

This invention relates to improvements in that class of oil-cups that are used on journal-bearings, and has for its object to provide a lubricating device of this character that will not be affected by the jar and vibration of the machinery.

This invention is more especially intended for use on locomotive-engines, where the jar is very severe and under which circumstances it is a difficult matter to maintain a uniform and continuous feed.

Figure 1 is a vertical longitudinal section of a device embodying our improved features; Fig. 2, a transverse section on line 2, Fig. 1, looking in the direction indicated by the arrow; Fig. 3, a plan of a removable feed-plug, and Fig. 4 an elevation of the same.

A represents the oil-cup, forming a reservoir for the lubricating material. The cup is of a cylindrical form and is provided with the integral attaching-stem B, screw-threaded, as at $a$. This stem will be made of a length in accordance with the thickness of the bearing, and when inserted will be set at about the distance from the pin or journal to be lubricated as shown in Fig. 1, C representing a pin or journal.

On the inside of the cup is placed a circular adjusting-nut D, which has a threaded engagement with the interior threaded surface of the cup, as shown at $a'$, Fig. 1. This nut and the tube E form an integral part and are connected by a number of arms $a^2$, as shown in Fig. 2.

A removable feed-plug F is inserted in the lower end of the attaching-stem and is provided with a feed-aperture $b$. This plug is cut out on different sides, as at $b'$, for the passage of the lubricant between the interior of the stem and the lower end of the tube E. The bottom of the feed-plug is straight or flat, the lower end of the tube being also cut off straight, so as to prevent the liability of the feed being entirely shut off should the adjacent surfaces accidentally come together.

The attaching-stem B will be provided with a right-handed thread and the removable feed-plug F with a left-handed thread for the purpose of preventing the feed-plug from unscrewing and sticking in the bearing when the oil-cup is removed.

One of the arms $a^2$ of the adjusting-nut D is cut in two, as shown at $d$, Fig. 2, and provided with a circular aperture for the insertion of a locking-screw G, having the threaded tapering end $d'$. The upper end of the locking-screw is provided with a slot $d^2$ for the engagement of a screw-driver in manipulating the screw.

The cup is closed by a removable head end H, having an opening in the top, which is in turn closed by a removable cap $h$.

The upper end of the tube E is closed by a screw $h'$. By removing the cap $h$ access may be had to the interior and the screw $h'$ taken out and the tube filled with oil, so as to insure a positive lubrication of the journal. When the journal is in motion, the action of the suction will cause the oil to flow from this tube, but when at rest the vacuum will hold the lubricant in the tube in suspension against waste.

Either oil or what is termed "soft grease" may be used in the reservoir or cup proper, so that should the lubricant in the cup not flow at once the oil from the tube will, and thus insure lubrication. The lower end of the tube E is provided with the tapering contracted passage $h^2$, which prevents too free a feed.

In setting and regulating the feed the circular nut D may be turned up or down, in accordance with the amount of space $g$ there is to be provided for between the bottom of the feed-plug and the lower end of the tube E. When properly adjusted, the tapering locking-screw G should be tightened, which has a wedging action and exerts a lateral pressure, locking the feed against disarrangement from vibration or jar.

By this arrangement the parts may be positively adjusted to a nicety and a uniform and continuous feed maintained under all conditions.

Having thus described our invention, what we claim as new, and desire to secure by Letters Patent, is—

The combination with an oil-cup, provided with an interior-threaded surface, of an adjusting-nut, engaging with said threaded surface, and having a tube connected therewith by a number of arms, one of said arms being divided, a locking-screw, inserted in the divided arm, a feed-plug, inserted in the lower end of the attaching-stem, and the removable screw inserted in the upper end of said tube, substantially as described.

In testimony whereof we affix our signatures in presence of two witnesses.

GEORGE McNEIL.
THOMAS J. ROGERS.

Witnesses:
L. M. FREEMAN,
L. B. COUPLAND.